United States Patent
Niakan et al.

(10) Patent No.: US 6,884,274 B2
(45) Date of Patent: Apr. 26, 2005

(54) HIGH FLOW, ONE PIECE AUTOMOTIVE AIR FILTER

(75) Inventors: Shahriar Nick Niakan, Corona, CA (US); Stuart T. Miyagishima, Corona, CA (US); Christopher C. Beau, Corona, CA (US); Oscar Morales, Corona, CA (US)

(73) Assignee: Advanced Flow Engineering, Inc., Corona, CA (US)

(*) Notice: Subject to any disclaimer, the term of this patent is extended or adjusted under 35 U.S.C. 154(b) by 127 days.

(21) Appl. No.: 10/405,018

(22) Filed: Mar. 31, 2003

(65) Prior Publication Data

US 2004/0187455 A1 Sep. 30, 2004

(51) Int. Cl.$^7$ .......................... B01D 46/02; B01D 46/10
(52) U.S. Cl. .......................... 55/486; 55/385.3; 55/482; 55/487; 55/495; 55/498; 55/499; 55/500; 55/501; 55/502; 55/505; 55/507; 55/510; 55/521; 55/524; 55/527; 55/528; 123/198 E
(58) Field of Search .................. 55/385.3, 482, 55/484, 486, 487, 490, 491, 495, 498, 499, 500, 501, 502, 505, 507, 510, 521, 522, 524, 527, 528, DIG. 28; 123/198 E; 210/459

(56) References Cited

U.S. PATENT DOCUMENTS

| | | | | |
|---|---|---|---|---|
| 2,598,603 A | * | 5/1952 | Richtarsic | 55/505 |
| 3,186,552 A | * | 6/1965 | Cutler | 55/510 |
| 3,307,337 A | * | 3/1967 | Freitas, Jr. et al. | 55/500 |
| 4,014,796 A | * | 3/1977 | Sugiyama et al. | 55/498 |
| 4,233,043 A | * | 11/1980 | Catterson | 55/385.3 |
| 4,251,238 A | * | 2/1981 | Claes et al. | 55/486 |
| 4,349,363 A | * | 9/1982 | Patel et al. | 55/498 |
| 4,623,365 A | * | 11/1986 | Bergman | 55/498 |
| 4,890,444 A | * | 1/1990 | Vander Giessen et al. | 55/498 |
| 5,304,351 A | * | 4/1994 | Tanaka et al. | 55/498 |
| 5,368,621 A | * | 11/1994 | Pool | 55/385.3 |
| 5,683,478 A | * | 11/1997 | Anonychuk | 55/385.3 |
| 6,475,255 B1 | * | 11/2002 | Walker, Jr. | 55/385.3 |

* cited by examiner

*Primary Examiner*—Duane Smith
*Assistant Examiner*—Jason M. Greene
(74) *Attorney, Agent, or Firm*—K. David Crockett, Esq.; Crockett & Crockett

(57) ABSTRACT

Air filter with a sidewall and inverted cone cap sections; a beveled crown unifying the sidewall with the cap to form a one-piece filter; a seat on the bottom of the wall section with seals for contact with a support; and a flange affixed to the cap to adjust contact with a support surface. The filter media includes four-layer oleophilic cotton mesh layers supported between two structural mesh layers, with an efficacious amount of oil to increase particle trapping.

31 Claims, 6 Drawing Sheets

HIGH FLOW, ONE PIECE AUTOMOTIVE AIR FILTER

FIELD OF THE INVENTIONS

The inventions described below relate the field of automotive air filters and air cleaners for engine air intake systems.

BACKGROUND OF THE INVENTIONS

Most people are familiar with air filters used in their cars. These filters are essential to proper operation of the engine, and help extend the life of the engine and its components. The air available to the typical automotive or industrial combustion engine always includes some dirt and debris, or particulate material. Particulate material can cause substantial damage to the internal components of the particular combustion system if taken into the engine.

The function of the air intake filter is to remove the particulate matter from the intake air, so that clean air is provided to the engine. The intake air stream flows from the influent, or "dirty," side of the filter to the effluent, or "clean," side of the filter, with the air filter extracting the unwanted particles via one or more filter media layers. Filter media are selected to trap particles exceeding a particular size, while remaining substantially permeable to airflow over an expected filter lifetime.

The features and filter design choices that lead to improvements in one of these parameters can lead to losses in the other performance parameters. Thus, filter design involves trade-offs among features achieving high filter efficiency, and features achieving a high filter capacity and concomitant long filter lifetime.

As used herein, filter efficiency is the propensity of the filter media to trap, rather than pass, particulates. Filter capacity is typically defined according to a selected limiting pressure differential across the filter, typically resulting from loading by trapped particulates. Volumetric filter flow rate, or flow rate, is a measure of the volume of air that can be drawn into the filter having a particular effective filter area, efficiency, and capacity, at a particular point in the expected filter lifetime.

The choice of filter media that has a high filter efficiency (that is, it removes a high percentage of the particulate material in the intake air) is important, because any particulate matter passing through the filter may harm the engine. For systems of equal efficiency, a longer filter lifetime typically is directly associated with higher capacity, because the more efficiently a filter medium removes particles from an air stream, the more rapidly that filter medium approaches the pressure differential indicating the end of the filter medium life. To extend filter lifetime, filter media can be pleated, providing greater filtering surface area.

The choice of air filter media that is permeable to airflow is important because the interposition of the filter into the intake air stream can impede the flow rate. This tends to decrease engine efficiency, horsepower, torque, and fuel economy. In applications demanding large volumes of filtered air, the ability to manipulate parameters such as air filter size, pleat depth, or both, is often constrained additionally by the physical environment in which the filter operates, e.g., the space available for a filter of a given configuration within the engine compartment.

Some existing air filters dispense with filter housings or enclosures in order to expose as much air filter media for filtration as possible. Other existing air filters attempt to improve airflow by providing a filter pan, which is substituted for a conventional air filter housing cover.

However, in approaching high volumetric flow applications, existing filters that provide a significantly improved filter flow rate may foster air turbulence at the filter intake, an undesirable quality which ultimately impairs air flow. Some existing filter designs employ abrupt topological transitions, which tend to encourage air eddies to develop, and to reduce airflow into the filter. Exemplary abrupt transitions can include, for example, a one-step ring, ledge, edge, or peak. Because air eddies can cause the influent air to bypass regions of the filter media near these abrupt transitions, the effective area available for filtration is reduced.

Filters using multiple pieces also may be prone to allowing nuts, caps and attachment devices to fall into the engine air intake during maintenance. Such an event would be highly undesirable, for example, during a high-performance automotive race.

It is desirable, then, that an air filter effects both a minimal reduction in air flow as well as a minimal increase in the resistance, or restriction, to air flowing into the engine, while facilitating a large flow rate. It also is desirable that such an air filter be provided in a convenient and relatively economical physical configuration. The deleterious effects of certain harsh operating environments, such as construction sites, long haul operations and off-road, recreational, and sports applications, can lead to degraded efficiency or unacceptably short lifetimes in these air filters, especially under high airflow conditions. In some cases, existing high-efficiency air filters may not be capable of providing the desired volumetric flow rate under extreme conditions.

SUMMARY

The devices described below provide for a long-lived, high-flow, high-efficiency one-piece engine air filter. The filter comprises a sidewall section and a cap section, both made of filter media, which are unified by a beveled crown to form a one-piece filter. The sidewall section includes a cylinder top and a cylinder bottom; and the cap section includes a base and an apex. The sidewall section is shaped as a cylinder with a central cavity. The cap section is shaped as a cone with a concave surface, and fits within the central cavity of the cylinder, so that the cylinder top is aligned with the cone base.

The crown includes a relatively flat portion, or land, attached to the cylinder top, and a tilted section, or bevel, attached to the cap base. The cap apex has a central opening adapted to receive a mounting post of a combustion engine air intake assembly, such an engine intake manifold, or a detachable air intake assembly. A tensioner can be included which holds the cap apex to the mounting post, and which can be adapted to adjust sealing contact between the air filter and a support surface of a filter pan on the combustion engine air intake assembly. A pliant flange can be attached to the cap apex, and can be positioned between the tensioner and the mounting post to form a seal. In some embodiments, the filter includes a seat, which has a top seat surface attached to the cylinder bottom, and a bottom seat surface having seals. The seals are adapted to fit around the filter circumference and to contact a support surface for the filter on the combustion engine air intake assembly.

The air filter media can be pleated filter media comprising natural fiber filter media, such as four oleophilic cotton mesh layers supported between two structural mesh filter layers.

Also, an efficacious amount of oil can be used to wet the cotton mesh layers, thereby increasing particle trapping by cotton mesh filter media. The pleated filter media also may include manufactured fiber filter media, such as spunbond polyester fiber layers. Furthermore, the pleats of the pleated filter media are sufficiently contoured, to allow substantial airflow through the pleats.

DETAILED DESCRIPTION OF THE INVENTIONS

Figure 1:
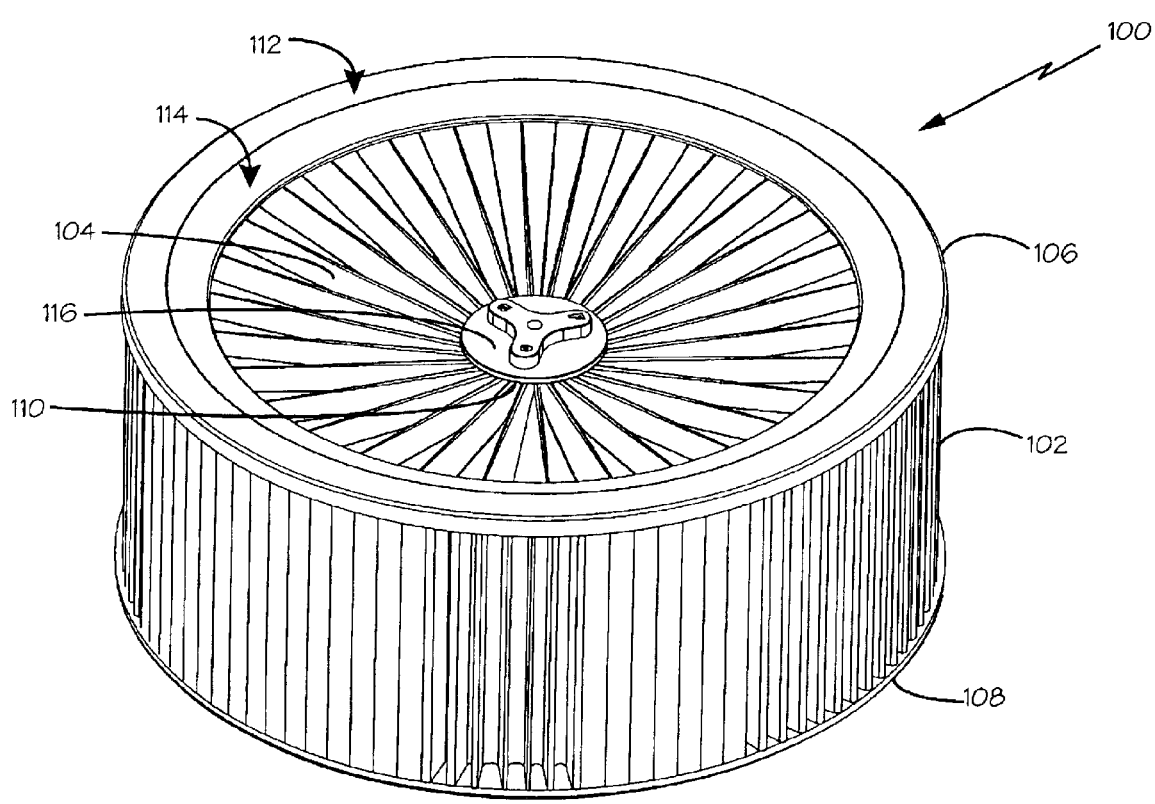
FIG. 1 is a perspective view of the high flow, one-piece air filter.

In FIG. 1, air filter 100 is shown to have sidewall section 102, cap section 104, and crown 106. Sidewall section 102 and cap section 104 comprise filter media. Filter 100 also can include either seat 108 and flange 110, or both. Crown 106, formed of land 112 and bevel 114, sealably conjoins, or unifies, sidewall section 102 and cap section 104 into one-piece filter 100. Conveniently, the arrangement of filter 100 causes the entering air to be filtered both by sidewall section 102 and by cap section 104.

Land 112 is a generally flat portion of crown 106, which desirably is positioned on the upper surface of sidewall section 102. Land 112 can be slightly contoured where it meets bevel 114, or the tilted crown section integral with land 106, and interposed between land 106 and cap section 104.

Tensioner 116 is used to impose a force upon flange 110 (shown in detail in FIG. 3) and, in turn upon cap section 104 to create a seal between flange 110 and tensioner 116. A portion of this force is translated through crown 106, and imposed in a direction generally parallel, to sidewall section 102, such that sealing contact can be made and adjusted between seat 108 and an air filter support surface (not shown). Thus, in cooperation with sidewall section 102 and cap section 104, crown 106 provides sufficient structural integrity and stability to filter 100 that it can used with or without an associated external enclosure or housing for protection, support, or both.

Although sidewall section 102 in filter 100 is illustrated as a circular cylinder, it is contemplated that sidewall section 102 be shaped, in general, as a right elliptical cylinder with an elliptical eccentricity of between about less than 1.0 to about 0.0. Similarly, although cap section 104 is illustrated as a circular cone, it is contemplated that cap section 104 be shaped, in general, as a right elliptical cone with an elliptical eccentricity of between about less than 1.0 to about 0.0.

As used herein, the term "right cylinder" is applied to a cylinder whose sides are substantially perpendicular to its base. A "right cone" section is one whose axis is a line segment joining the cone apex to the midpoint of the cone base. The term "elliptical eccentricity" is a dimensionless value that describes the relative roundness of a shape, such as sidewall section 102 and cap section 104. In general, elliptical eccentricity (e) is related to the ratio of the minor axis (b) of an elliptical shape to the major axis (a) of the shape, by the relationship:

$$e = \mathrm{sqrt}(1 - (b^2/a^2))$$

Thus, when the elliptical eccentricity of a given shape has a value of about 0.0, the value of minor axis b is substantially equal to the value of major axis a, and the shape is essentially round. As the elliptical eccentricity of the shape increases towards a value of about less than 1.0, the shape becomes increasingly elliptical, or oval.

In some embodiments, it is contemplated that sidewall section 102 is a cylinder, and that cap section 104 be an inverted cone section inserted into a central cavity in the cylinder. However, in other embodiments, it also is contemplated that sidewall section 102 is an upright cone section, and that cap section 104 be an inverted cone section inserted into a central cavity in the upright cone section. In such embodiments, the apex of the sidewall section is generally wide enough, relative to the base of the cap section, to allow the inverted cone to fit within the sidewall section cavity.

For a given filter 100, it is further contemplated that the elliptical eccentricity of cap section 104 is substantially equal to that of sidewall section 102 and of crown 106, and that cap section 104 is adapted to fit substantially within sidewall section 102. Although filter 100 is shown with the filter diameter being greater than the filter height, filter 100 also can be constructed such that the value of the filter height is greater than the filter diameter.

For simplicity, subsequent references to a "cylinder" or a "cylindrical shape" comprehend all suitable cylinders including, without limitation, a right elliptical cylinder with an elliptical eccentricity of between about less than 1.0 to about 0.0. Furthermore, subsequent references to a "cone section" will comprehend all suitable conical frusta including, without limitation, a right elliptical cone with an elliptical eccentricity of between about less than 1.0 to about 0.0. Moreover, subsequent references to the "sidewall section" of the filter include embodiments of all suitable cylinders and of all suitable cone sections. Typically, references to the "cap" or "cap section" of the filter include embodiments with a cone section that typically is inverted relative to the sidewall section.

A practitioner of ordinary skill in the fluid filter arts would realize that the foregoing descriptions are merely exemplary, and that air filter 100, as described herein, can assume a myriad of regular and modified right elliptical shapes. Such shape can include, without limitation, a circular shape; an oval, or elliptical, shape; a modified oval (racetrack) shape; and other filter shapes, which are capable of providing sufficient structural integrity.

Figure 2:
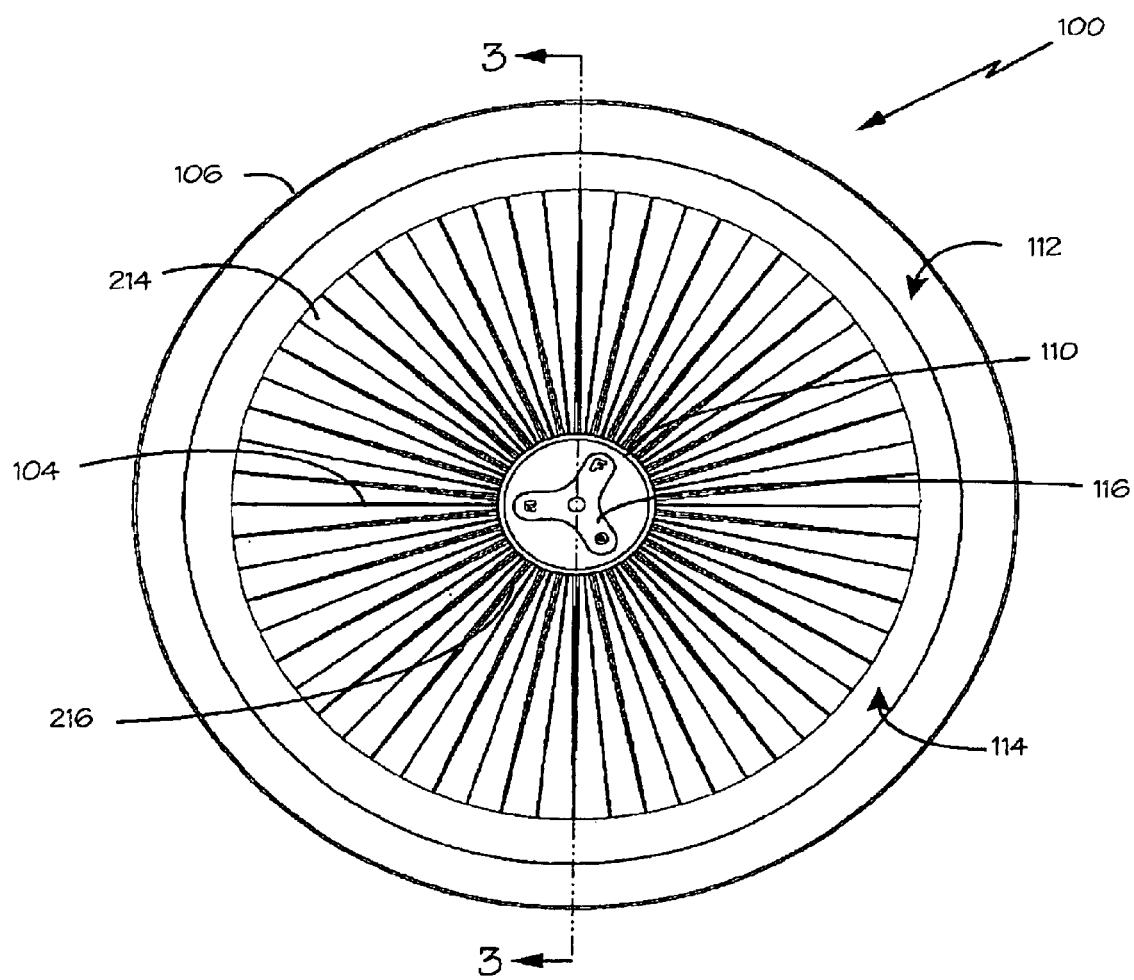
FIG. 2 is a top view of the high flow, one-piece air filter.

Turning to FIG. 2, a top view of filter 100 is illustrated, in which crown 106, cap section 104, and flange 110 are seen. From this vantage, crown 106 is seen to include land 112 and bevel 114. Land 112 can be affixed to the upper sidewall section (not shown) of the sidewall section (not shown). Bevel 114 can be affixed to the cap base section 214 of cap section 104. Flange 110 can be affixed to the apex section 216 of cap section 104. Typically, flange 110 is contacted by tensioner 116 which, when tightened, adjusts sealing contact between filter 100, a mounting post (not shown) and a support surface (not shown) on which filter 100 is placed.

Figure 3:
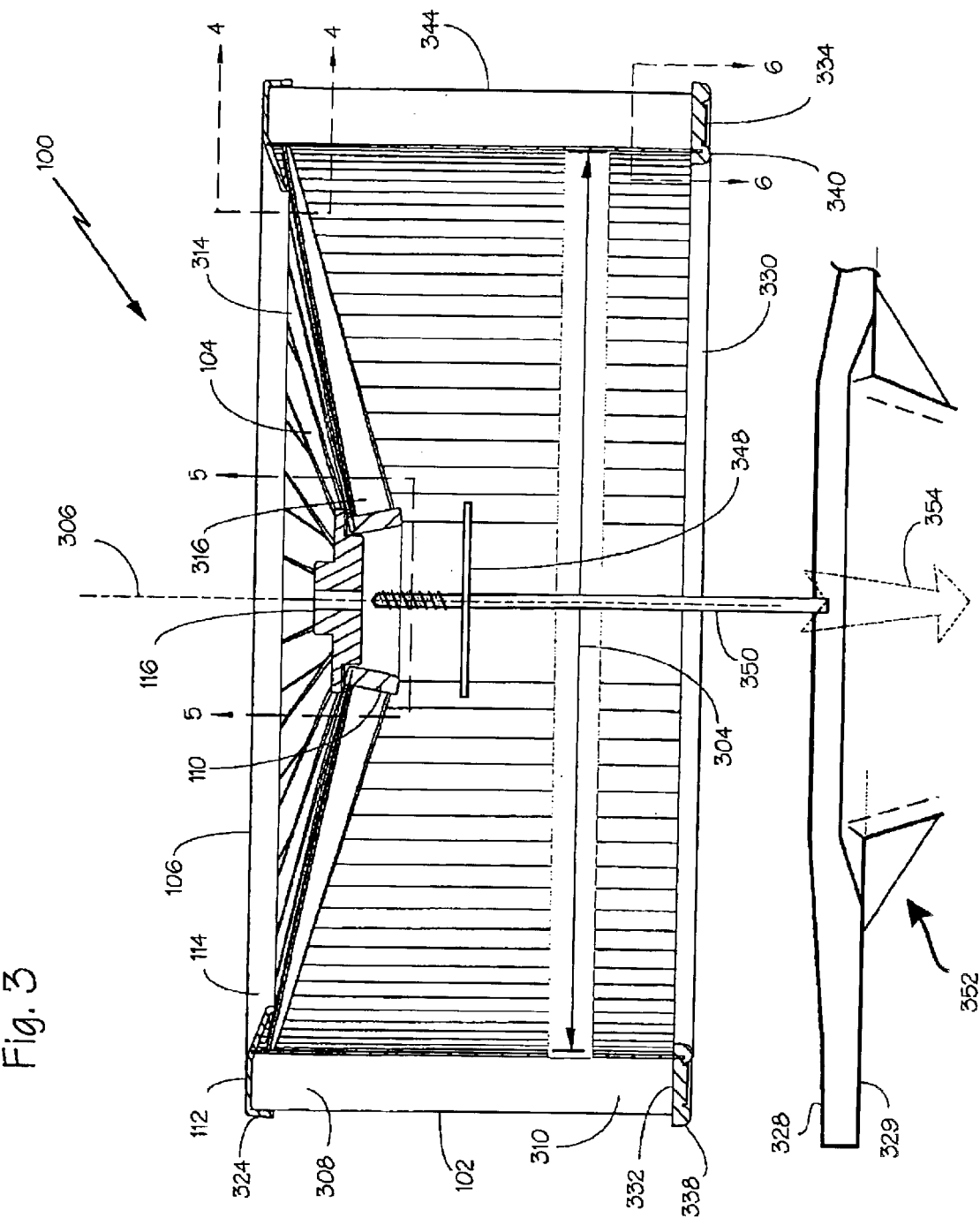
FIG. 3 is a cross-sectional illustration of the high flow, one piece air filter, described in FIGS. 1 and 2, positioned on the filter support of an engine air intake assembly.

FIG. 3 is illustrative of filter 100, which is a cross-section of filter 100, as viewed through plane 3 in FIG. 2. Filter 100 includes sidewall section 102, here shaped as a cylinder disposed about axis 306. In general, sidewall section 102 forms central cavity 304, and can include upper sidewall section 308 and lower sidewall section 310. As described relative to FIG. 1 above, central cavity 304 of sidewall section 102 can have a center on axis 306.

Filter 100 also includes cone-shaped cap section 104, disposed about axis 306. Cap section 104 can include base section 314 and apex section 316. Conveniently, cap section 104 is disposed as an inverted cone section within central cavity 104. As such, base section 314 typically has diameter larger than apex section 316.

It is desirable that crown 106 unifies, i.e., sealably conjoins, upper sidewall section 308 to base section 314, thereby forming one-piece filter 100. Crown 106 can have a two-step topology, formed from land 112 and bevel 114. Land 112 typically can be affixed to upper sidewall section 308, and may have lateral portion, or lip 324, disposed on, and affixed to, outer layer 344 of sidewall section 102. Also, bevel 114 can be affixed to base section 314.

In some embodiments, flange 110 can be affixed to apex section 316, and disposed around axis 306. Tensioner 116 is shown in FIG. 3 in an exemplary arrangement, in which sealing contact between air filter 100 and support and sealing surface 328 of the mounting plate 329, is accomplished by screwing tensioner 116 onto mounting post 350. Engine air intake assembly 352, to which mounting post 350 and mounting plate 329 can be attached, provides a conduit for "clean" intake airflow to the associated combustion engine. Support surface 328 can be part of the filter "pan" of engine air intake assembly 352. Examples of an air intake assembly include a detachable engine air intake assembly, an air intake assembly fixed to the engine, an intake manifold, air cleaner assembly and the like.

As tensioning force is applied to tensioner 116, it is brought into contact with flange 110. A portion of the force can be translated from flange 110 to cap section 104, through crown 106 into sidewall section 102, causing seat 330 to be adjusted into contact with support surface 328.

In use, the contact between tensioner 116 and flange 110, as well as between seat 330 and support surface 328 can be sealable contact, such that substantially all of the "dirty" air entering sidewall section 102 and cap section 312 is cleaned by the filter media in filter 100, and is directed into the associated engine as clean air stream 354 via air intake assembly 352. Conveniently, filter 100 tends to reduce turbulence in air stream 354, which can be beneficial to the efficiency and lifespan of the engine which filter 100 serves.

In some embodiments, it may be desirable to provide flange seat 348 on threaded post 350 to create an additional contact for flange 110. Although tensioner 116 is shown in an exemplary arrangement suitable for use with threaded post 350, tensioner 116 also can be adapted as an unthreaded cap or nut, a snap-lock device, or another attachment device, which provide the desired contact between flange 110 and tensioner 116.

Advantageously, flange 110 can be composed of a pliant material, including, without limitation, elastomers such as urethanes and polyurethanes. In some embodiments, pliant flange 110 can include a peaked ring shape adapted to sealably contact tensioner 116.

Filter 100 also can include seat 330, having top seat surface 332 and bottom seat surface 334. Top seat surface 332 can be conveniently affixed to lower sidewall section 310.

Also, bottom seat surface 334 can have two or more circumferential mating seals 338, 340 adapted to sealably contact support surface 328. That is, each of the seals 338, 340 is positioned on bottom seat surface 334 around the circumference of seat 330. Seals 338, 340 can mate with support surface 328 to prevent significant air leaks between surface 328 and seat surface 334. In certain embodiments, first seal 338 can be attached to bottom seat surface 334, proximate to outer layer 344 of sidewall section 102. Second seal 340, having an approximately circular, to semi-circular, section, can be attached to bottom seat surface 334, proximate to central cavity 304. Additionally, bottom seat surface 334 itself may provide a circumferential mating seal in sealable contact with support surface 328.

Figure 4:
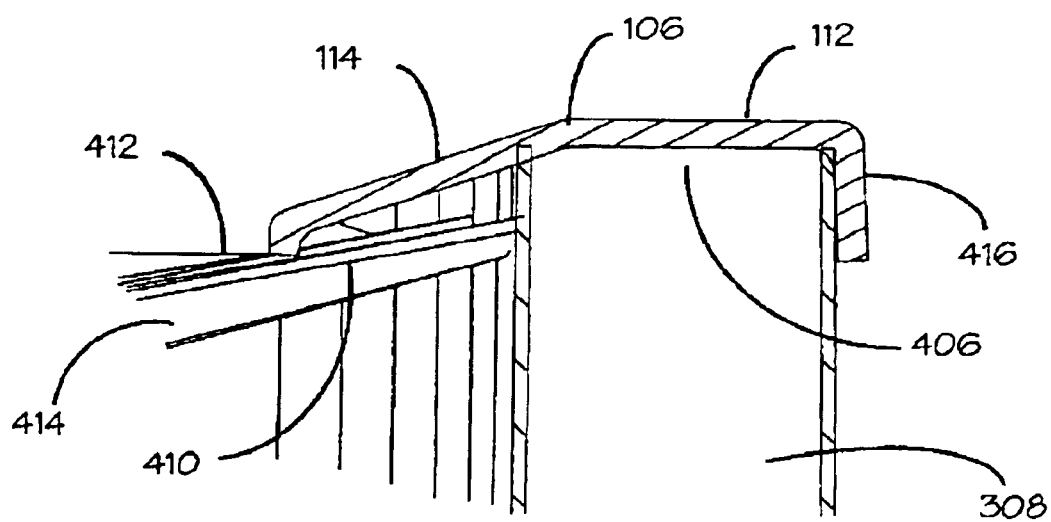
FIG. 4 is a cross-sectional view of the beveled crown of the high flow, one-piece air filter, taken through plane 4 in FIG. 3.

FIG. 4 shows crown 400 in cross-section, as viewed along plane 4 through crown 318 in FIG. 3. Crown 106 includes land 112 and bevel 114. Conveniently, land 402 can be affixed to top surface 406 of upper sidewall section 308. Similarly, bevel 114 can be affixed to top surface 410 of base section 412. Land 402 also can include lip 416, which generally extends laterally along upper sidewall section 308. In this way, crown 400 conjoins wall the media section at upper sidewall section 308 and the cap section at base section 412. Crown 400 can be composed of a pliant material, such as, for example, urethane, polyurethane, etc., so that the resulting filter 400 is flexible, durable, inexpensive, easy to manufacture, and relatively lightweight.

It is desirable that crown 106 provide sufficient structural support and alignment for both upper sidewall section 308 and base section 412, such that the overall physical configuration of the filter is maintained. It also is desirable that crown 400 form a seal between upper sidewall section 308 and base section 412, so that unfiltered air does not leak through any gaps which may exist at their juncture.

Advantageously, land 112 and bevel 114 cooperate to create a two-stage topological, or surface, transition that may condition the air flow entering cap section 414 to become more laminar, and less turbulent, in nature. Desirably, airflow into the air filter is increased, and air eddies over the regions proximate to bevel 114 can be reduced. These effects allow a greater portion of the filter media, for example, in base section 412, to be engaged in air filtration, which tends to maximize the effective filter area available for filtration, as well as filter life.

Figure 5:
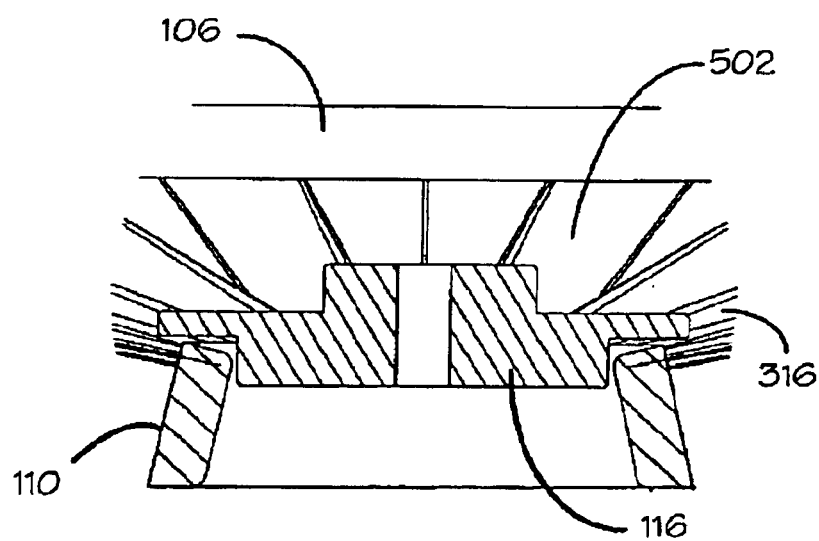
FIG. 5 is a cross-sectional view of the apex section of the high flow, one piece air filter, taken through plane 5 in FIG. 3.

FIG. 5 shows flange 110 and cap section 502 in cross-section, as viewed along plane 5 in FIG. 3. Flange 110 can be affixed to apex section 316 of cap section 502 such that flange 110 provides some structural support and alignment for cap section 502. The support provided by flange 110 can cooperate with the support provided by crown 106 such that the overall physical configuration of the filter is maintained. As before, flange 110 may be pliant, allowing sealable contact with tensioner 116, as tension is applied thereto. In some embodiments, flange 110 can include a peaked, pliant ring at the region of contact with tensioner 116, to facilitate sealing. It should be readily apparent to the ordinary artisan of air filters that the particular flange and tensioner arrangement can be modified in many ways to effect desirable results.

Figure 6:
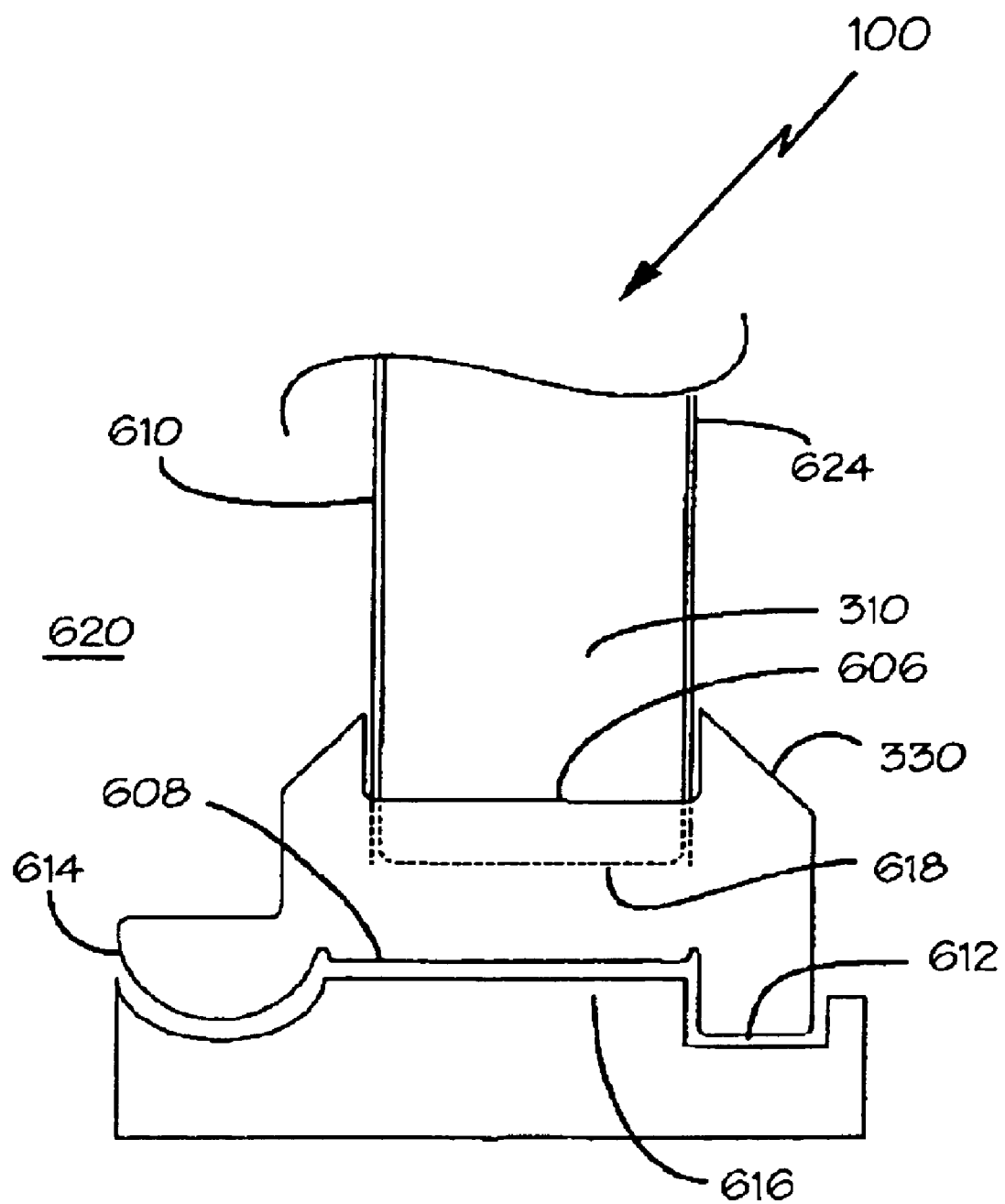
FIG. 6 is a cross-sectional view of the seat of the high flow, one-piece air filter, taken through plane 6 in FIG. 3.

FIG. 6 illustrates a portion of filter 100 in cross-section, as viewed along plane 6 in FIG. 3, in which seat 330 is in contact with lower sidewall section 310 of filter 100. The seat 330 can include a top seat surface 606 and a bottom seat surface 608. In general, lower sidewall section 310 is in sealable contact with top seat surface 606. It may be desirable to embed portion 618 of wall filter media 610 within top seat surface 606 to provide additional sealing and structural integrity to filter 100.

Bottom seat surface 608 can include one or more mating seals 612 and 614, which are disposed on the circumference of bottom seat surface 608. One or both of mating seals 612 and 614 can be adapted to sealably contact filter support surface 616. In many applications, the support and sealing surface of the of the air intake housing 352 will be flat, as illustrated in FIG. 3, but, as illustrated in FIG. 6, the support and sealing surface can be shaped to match and mate the lower contour of seat surface and mating seals. Thus, seals 612 and 614 can prevent substantial leaks of unfiltered air into filter cavity 620.

In certain embodiments, first mating seal 612 can be adapted to provide flexible sealing between support surface 616 and bottom seat surface 608 proximate to outer layer 624 of wall filter media 610. Similarly, second mating seal 614 has an approximately circular section, which can be adapted to provide flexible sealing, between support surface 616 and bottom seat surface 608, proximate to filter cavity 620 of wall filter media 610. In addition, bottom seat surface 608 can be adapted to provide flexible sealing between itself and support surface 616.

Figure 7:
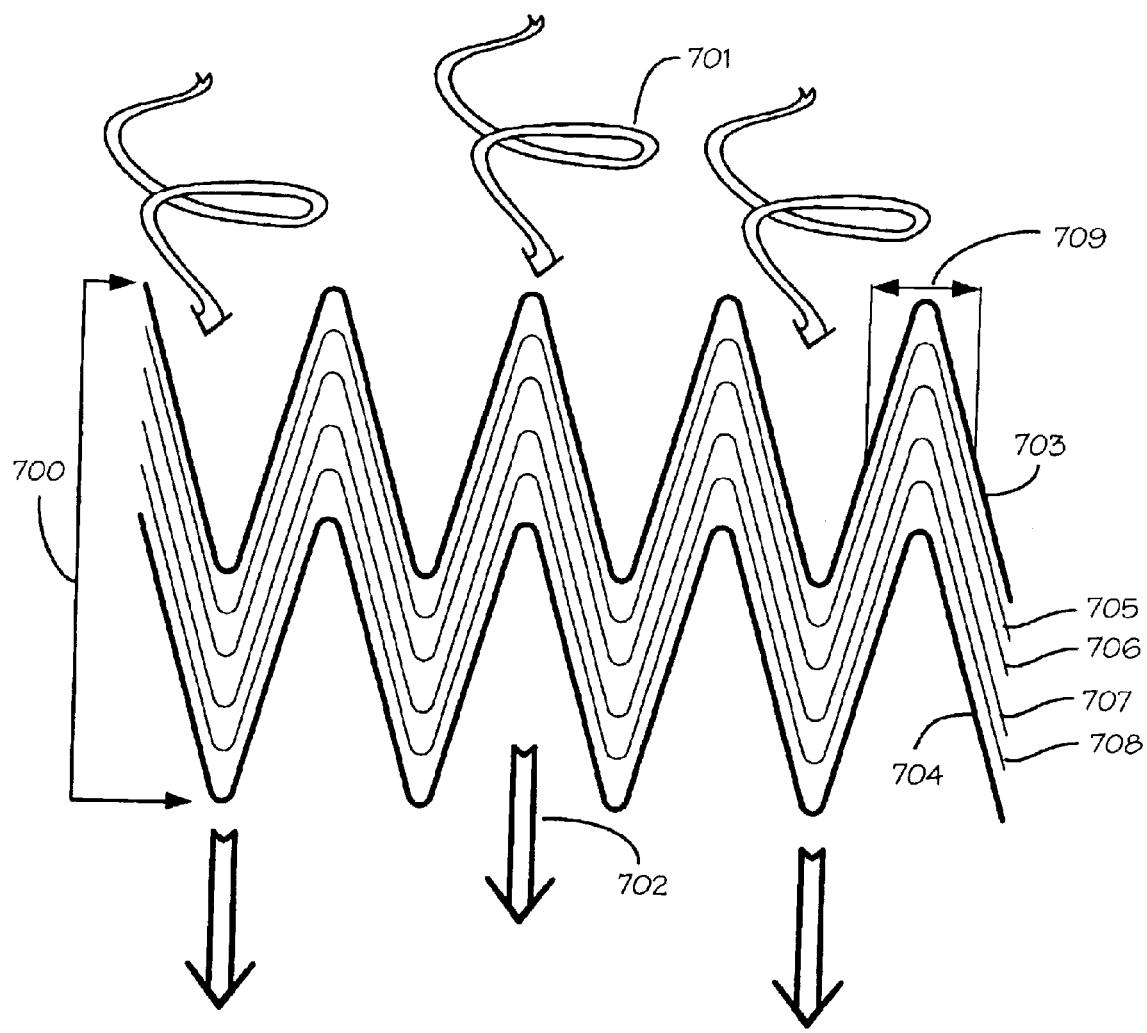
FIG. 7 is a cross-sectional illustration of a multi-layered filter media of the high flow, one-piece air filter.

FIG. 7 is illustrative of a type of pleated filter media 700, which can be used with air filters, such as those shown in FIGS. 1–6. Filter media 700 cleans particulate-bearing influent air stream 701 to provide a substantially particulate-free effluent air stream 702. Pleated filter media 700 employs multiple layer filter media, and can be formed by interposing fiber-based filter layers 705–708 between pleated structural mesh filter layers 703, 704 in a supported relationship.

In some embodiments, it is desirable to form "soft" pleats, such that the apex of an individual pleat is not sharply angular and constrictive, but is sufficiently arcuate, or contoured, to allow a significant amount of airflow through the bend of the pleat. Pleats, including pleat 709, can be so disposed, allowing more of filter media 700 to be used for filtering, than otherwise would be available with "hard" pleats having sharp, angular bends. Advantageously, the additional air flow through pleats, such as pleat 709, can improve volumetric flow directly, through the filter media 700, and indirectly, by tending to reduce the turbulence caused by back pressure arising from air currents deflected by more restrictive pleat configuration.

In some embodiments, it may be desirable to provide successive fiber-based filter layers 705–708 as natural fiber mesh layers, having substantially similar structural characteristics. In other embodiments, it may be desirable to form a gradient-density, depth-loading filter media 700, in which successive filter layers 705–708 increase in density.

In embodiments of gradient-density, depth-loading filter media 700, the coarsest mesh filter layer 705 is disposed proximate to influent mesh layer 703, and the finest mesh filter layer 708 is disposed proximate to effluent mesh layer 704. Mesh filter layer 706 is generally more fine than mesh filter layer 705. In turn, mesh filter layer 707 is generally finer than mesh filter layer 706, but coarser than mesh filter layer 708. In yet other embodiments, it may be desirable to alternate finer and coarser layers for mesh filter layers 705–708.

Suitable natural fiber mesh for layers 705–708 are most conveniently cotton, but other natural fibers such as silk, jute, ramie, flax, cellulosic fibers, wool, and the like may be used. It is desirable to use cotton meshes, because the constituent cotton fibers tend to be both highly wickable and highly piteous, that is, each cotton thread has many small, hairy fibers sticking out of it.

Cotton meshes can include gauze, cheesecloth, and spun laced cotton fabric. Gauze, cheesecloth, and similar fabrics are thin, soft, plain weave, open-meshed, low thread-count fabric. An example of a cotton gauze, which can be advantageously employed in filter media 700, is "absorbent gauze," as described in the United States Pharmacopoeia (USP). Absorbent gauze is desirable as a filter medium because it must meet specific standards of construction, chemical purity, and absorbency in order to be listed in the USP. Furthermore, plain-woven or spun-lace cotton fabrics can be used alone, or in combination, to form this region of natural fiber mesh.

In still other embodiments of filter media 700, filter layers 705–708 can include both natural fibers and manufactured fibers. Manufactured fiber layers are most conveniently made of synthetic fibers, such as spunbond polyester, but can also be made of other synthetic fabrics (e.g., nylon, olefin, and acrylic); polymers; glasses; modified or transformed natural polymers; and modified cellulosic fibers.

Exemplary spun-bond polyester fibers include Reemay® 2024 medium, being about 12 mils thick with a basis weight of about 71 g./sq. m.; and Reemay® 2033 medium, being about 17 mils thick with a basis weight of about 100 g./sq. m. Both media are formed from straight, trilobal polyester fibers having a diameter of about 23 microns. Reemay® media are produced by Reemay, Inc., Old Hickory, Tenn., and are well known in the air filtration art. Other synthetic fibers may be used and, in general, absorbent, efficient, fibers with a low contaminant content, are especially desirable.

Structural mesh layers 703, 704 can be made of a lightweight aluminum mesh, although layers 703, 704 also may be fabricated from various metals, plastics and polymers.

In general, filter media 700 is cut, pleated, and formed to the desired shape, with the edges of filter media 700 being fused into a frame. In the context of filter 100 in FIG. 3, the frame of filter 100 can include, for example, crown 106, flange 110, and seat 330. Such a frame advantageously serves as a seal between sidewall section 102 and cap section 104, as well as between filter 100 and support surface 328 of air intake assembly 352. By fusing media 700 into a frame, filter 100 can be physically adapted for use with engine air intake assembly 352. Also, circumferential seals 336, 338, 340 on seat 330 can provide particular aspects of an air tight seal between seat 330 and support surface 328. Filter frame members 318, 110, 330 can be made of a compliant urethane, polyurethane, or other suitable elastomer.

Treating filter media 700 with oil or other tacking agent can extend the lifespan of the filter described above. One or more filter layers 705–708 may be wetted with oil. Because the fine pili, or hairs, of cotton fibers are generally oleophilic, i.e., oil-absorbent, the oil tends to be thoroughly wicked and absorbed into the cotton fabric. It is desirable to merely wet, and not soak, filter media 700 with oil, because oil soaking, which completely fills with oil the interstices, or spaces, between the fabric threads, tends to increase resistance to airflow.

By selecting the type and the composition of the oil employed during oil wetting, the individual cotton fiber pili, or hairs, tend to swell, and present an advantageously larger surface area to the flowing air, further enhancing the performance of filter media 700. Suitable tacking agents for wetting the filter media include mineral oil, engine oil, and other tacking agents, and combinations of these components. Such tacking agents are available from Advanced Flow Engineering of Corona, Calif.

Advantageously, the high flow, one piece automotive air filter described in FIGS. 1–7 can be washable and reusable.

Both the natural fiber layers and, when used, synthetic fiber layers, can be cleaned with a simple cleaning solution and water, thereby substantially removing the particle load that accrued over the filter cycle lifetime, or period during which the filter was in use.

In embodiments employing oil wetting, an efficacious amount of oil, such as a mineral oil, may be applied after cleaning to re-wet the oleophilic portions of the filter media. Oil can be applied in an aerosol spray, such as AFE air filter oil, also available from Advanced Flow Engineering of Corona, Calif. The filters described above can have a cumulative lifetime of, for example, between 15 to 35 cycle lifetimes. The cumulative lifetime of the filter often can be comparable to the lifetime of the combustion engine in which it is used.

In its typical use, the air filter described above replaces typical automotive air filters and combustion engine air filters. The filter may be cleaned periodically, sprayed with oil and placed back in service after repeated uses. The high capacity of the air filter provides for longer intervals between servicing than can be tolerated with stock air filters.

The components of the air filter described above can be varied, while still obtaining the advantages of the high-flow, one-piece filter. The structural mesh, for example, can comprise wire screen, expanded metal mesh, woven and welded metal mesh, and perforated metal sheets. The particular configuration of the mesh structure, including mesh thickness, rigidity, malleability, mesh opening size and shape, and so forth, can be selected to provide mesh layers 703, 704 with the desired physical characteristics, including air permeability, strength, longevity, and shape.

For example, mesh layers 703, 704 can be configured such that the mesh openings create an insubstantial contribution to total air flow restriction across filter media 700, yet support and protect filter medium layers 705–708, which are sandwiched between structural filter mesh layers 703, 704. Mesh layers 703, 704 can cooperate with other components, including flange, cap section, crown, and sidewall section, to provide the desired structural integrity and stability, such that an external housing or additional support may not be employed in use. The number of natural fiber layers can be varied from the four-layer construction illustrated above. The number of manufactured fiber layers also can be varied, when used.

Additionally, while the air filter has been described in connection with its application to combustion engines, the filter can be adapted to be a fluid filter, which may be used in a wider variety of applications. Exemplary applications can include, without limitation, conditioning and purifying air for buildings and clean rooms; cleaning air provided to air compressor intakes; and filtering air and gases provided to any industrial system requiring pure air. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A fluid filter, comprising:
   a. a sidewall section shaped as a right elliptical cylinder disposed about an axis and having a central cavity therein, the sidewall section having an upper sidewall section and a lower sidewall section, a base of the sidewall section being substantially perpendicular to the axis, the sidewall section having an elliptical eccentricity of between about less than 1.0 to about 0.0;
   b. a cap section shaped as a right elliptical cone frustum having a base section and an apex section, the cap section being invertedly disposed within the central cavity about the axis, the cap section having an elliptical eccentricity substantially equal to the elliptical eccentricity of the sidewall section; and
   c. a crown sealably conjoining the upper sidewall section to the base section, the crown having a land affixed to the upper sidewall section and a bevel affixed to the base section.

2. The fluid filter of claim 1, further comprising a seat with a top seat surface and a bottom seat surface, the top seat surface being affixed to the lower sidewall section, and the bottom seat surface having at least on circumferential mating seal adapted to sealably contact a support surface.

3. The fluid filter of claim 2, further comprising a pliant flange affixed to the apex section and disposed around the axis, the pliant flange adapted to adjust sealing contact between the fluid filter and the support surface.

4. The fluid filter of claim 1, further comprising pleated filter media in at least one of the sidewall section and the cap section.

5. The fluid filter of claim 2, further comprising pleated filter media in at least one of the sidewall section and the cap section, wherein the pleated filter media further comprises four oleophilic cotton mesh layers interposed in a supported relationship between two structural mesh layers, and further comprising an efficacious amount of oil disposed in the cotton mesh layers, the oil wetting the cotton mesh fibers, thereby increasing particle trapping by cotton mesh filter media.

6. The fluid filter of claim 4, wherein the pleated filter media comprises natural fiber filter media.

7. The fluid filter media of claim 6, wherein the natural fiber filter media is oleophilic, and further comprising an efficacious amount of oil disposed in the natural fiber filter media, the oil wetting natural fibers, thereby increasing particle trapping by the natural fiber filter media.

8. The fluid filter of claim 7, wherein the pleated filter media further comprises manufactured fiber filter media.

9. The fluid filter of claim 8, wherein the natural fiber filter media further comprises cotton mesh layers, and the manufactured fiber filter media region further comprises spunbond polyester fiber layers.

10. The fluid filter of claim 9, further comprising two structural mesh layers with the natural fiber filter media interposed in a supported relationship therebetween.

11. The fluid filter of claim 2, wherein the plurality of circumferential mating seals comprise a first seal attached to the bottom seat surface proximate to an outer layer of the sidewall section; and a second seal attached to the bottom seat surface proximate to the filter cavity, the second seal having an approximately circular section.

12. The fluid filter of claim 11, further comprising pleated filter media in at least one of the sidewall section and the cap section, wherein the pleated filter media further comprises four oleophilic cotton mesh layers interposed in a supported relationship between two structural mesh layers, and further comprising an efficacious amount of oil disposed in the cotton mesh layers, the oil wetting the cotton mesh fibers, thereby increasing particle trapping by cotton mesh filter media.

13. The fluid filter of claim 12, further comprising a pliant flange affixed to the apex section and disposed around the axis, the plant flange adapted to adjust sealing contact between the fluid filter and the support surface.

14. The fluid filter of claim 13, wherein pleats of the pleated filter media are sufficiently arcuate to allow a substantial airflow through the pleats.

15. The fluid filter of claim 2, wherein the support surface comprises a fluid intake assembly.

16. The fluid filter of claim 3, wherein the pliant flange comprises a peaked ring adapted to sealably contact a tensioner.

17. An air filter for an internal combustion engine, comprising:
  a. a sidewall section shaped as a right elliptical cylinder disposed about an axis and having a central cavity therein, the sidewall section having an upper sidewall section and a lower sidewall section, a base of the sidewall section being substantially perpendicular to the axis, the sidewall section having an elliptical eccentricity of between about less than 1.0 to about 0.0;
  b. a cap section shaped as a right elliptical cone frustum having a base section and an apex section, the cap section being invertedly disposed within the central cavity about the axis, the cap section having an elliptical eccentricity substantially equal to the elliptical eccentricity of the sidewall section; and
  c. a crown sealably conjoining the upper sidewall section to the base section, the crown having a land affixed to the upper sidewall section and a bevel affixed to the base section;
  d. a seat with a top seat surface and a bottom seat surface, the top seat surface affixed to the lower sidewall section, and the bottom seat surface having a plurality of circumferential mating seals adapted to sealably contact a support surface; and
  e. a pliant flange affixed to the apex section and disposed around the axis, the pliant flange adapted to adjust sealing contact between the air filter and the support surface;
  wherein at least one of the sidewall section and the cap section comprises a pleated natural fiber filter media, the natural fiber therein being oleophilic, and further comprising an efficacious amount of oil disposed in the pleated natural fiber filter media, the oil wetting natural fibers, thereby increasing particle trapping by the pleated natural fiber filter media.

18. The air filter for an internal combustion engine of claim 17, wherein the pleated filter media further comprises four oleophilic cotton mesh layers interposed in a supported relationship between two structural mesh layers.

19. The air filter for an internal combustion engine of claim 18, wherein the plurality of circumferential mating seals comprise a first seal attached to the bottom seat surface proximate to an outer layer of the sidewall section, the first seal having an approximately circular section; and a second seal attached to the bottom seat surface proximate to the filter cavity.

20. The air filter for an internal combustion engine of claim 19, wherein at least one of the crown, the seat, and the flange comprise a compliant elastomer.

21. The air filter for an internal combustion engine of claim 19, wherein the compliant elastomer comprises one of a urethane and a polyurethane.

22. The air filter for an internal combustion engine of claim 20, wherein the pleated filter media further comprises at least one layer of manufactured fiber media.

23. An air filter, comprising:
  a. a cylinder of filter media, wherein the cylinder includes a cylinder top, a cylinder bottom, and a cylinder cavity; and
  b. a cap of filter media, wherein the cap is sized and dimensioned to fit in the cylinder cavity and to substantially cover the cylinder top, the cap being fixed to the cylinder top and having a concave upper surface and a central opening, the central opening in the cap being adapted to receive a mounting post.

24. The air filter of claim 23, wherein the filter media comprises pleated filter media having four oleophilic cotton mesh layers supported between two structural mesh layers, and wherein the cotton mesh layers are oil-wetted using an efficacious amount of oil.

25. The air filter of claim 24, further comprising an air intake assembly having the mounting post fixed thereto.

26. The air filter of claim 25, further comprising a beveled crown unifying the cylinder and the cap.

27. The air filter of claim 26, further comprising a seat on the cylinder bottom, the seat forming a seal in contact with a filter pan of the air intake assembly.

28. The air filter of claim 27, wherein the seat further comprises a first seal attached to the seat in contact with the filter pan proximate to an outer surface of sidewall; and a second seal attached to the seat in contact with the filter pan proximate to the cylinder cavity, the second seal having an approximately circular section.

29. The air filter of claim 27, further comprising a tensioner adapted to fit over the central opening of the cap and to hold the air filter to the mounting post on the air intake assembly.

30. An air filter comprising:
  a. an engine air intake assembly having a mounting post and a filter pan attached thereto;
  b. a pleated filter media cylinder, the cylinder having a cylinder top, a cylinder bottom, and a cylinder cavity;
  c. a pleated filter media cap, the cap being attached to the cylinder top, the cap being sized and dimensioned to fit into the cylinder cavity and to substantially cover the cylinder cavity at the cylinder top, the cap having a concave upper surface and a central opening, and the central opening being adapted to receive the mounting post;
  d. a beveled crown attached to and unifying the cylinder and the cap;
  e. a seat on the cylinder bottom, the seat forming a seal in contact with the filter pan;
  f. a flange attached to the cap around the central opening; and
  g. a tensioner that releasably attaches the filter to the engine air intake assembly and seals the central opening;
  wherein the pleated filter media comprises four oleophilic cotton mesh layers supported between two structural mesh layers, and wherein the cotton mesh layers are oil-wetted using an efficacious amount of oil.

31. The air filter of claim 30, wherein the seat further comprises a first seal attached to a first portion of the seat in contact with the filter pan proximate to an outer surface of the cylinder; and a second seal attached to a second portion of the seat in contact with the filter pan proximate to the cylinder cavity, the second seal having an approximately circular section.

* * * * *